(12) United States Patent
Chen et al.

(10) Patent No.: US 11,509,853 B2
(45) Date of Patent: Nov. 22, 2022

(54) IMAGE SENSOR AND IMAGE COLLECTION SYSTEM

(71) Applicant: OmniVision Sensor Solution (Shanghai) Co., Ltd, Shanghai (CN)

(72) Inventors: Shoushun Chen, Shanghai (CN); Menghan Guo, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/680,446

(22) Filed: Feb. 25, 2022

(65) Prior Publication Data

US 2022/0182570 A1    Jun. 9, 2022

Related U.S. Application Data

(63) Continuation of application No. PCT/CN2019/109334, filed on Sep. 30, 2019.

(30) Foreign Application Priority Data

Aug. 30, 2019    (CN) .......................... 201910818487.7

(51) Int. Cl.
*H04N 5/374* (2011.01)
*H04N 5/3745* (2011.01)
*H04N 5/378* (2011.01)
*H04N 5/351* (2011.01)
*H04N 5/376* (2011.01)

(52) U.S. Cl.
CPC ............. *H04N 5/378* (2013.01); *H04N 5/351* (2013.01); *H04N 5/376* (2013.01); *H04N 5/3742* (2013.01); *H04N 5/37457* (2013.01)

(58) Field of Classification Search
None
See application file for complete search history.

(56) References Cited

U.S. PATENT DOCUMENTS

2003/0108221 A1* 6/2003 Stevenson ............ G06V 20/588
382/104
2019/0058842 A1    2/2019 Totsuka et al.

FOREIGN PATENT DOCUMENTS

| CN | 101277411 A | 10/2008 |
| CN | 106162000 A | 11/2016 |
| CN | 108827461 A | 11/2018 |
| CN | 109040711 A | 12/2018 |
| CN | 109274896 A |  1/2019 |

\* cited by examiner

*Primary Examiner* — Mark T Monk
(74) *Attorney, Agent, or Firm* — IPro, PLLC; Na Xu

(57) ABSTRACT

The present disclosure provides an image sensor and an image collection system. The image sensor includes: a pixel collection circuitry array including a plurality of pixel collection circuitries, each pixel collection circuitry being configured to monitor a change in a light intensity in a field of view and enter a triggered state when the change in the light intensity meets a predetermined condition; a boundary triggered pixel determination array configured to determine a boundary triggered pixel collection circuitry in the pixel collection circuitries in the triggered state; and a reading unit configured to respond to the boundary triggered pixel collection circuitry and output address information about the boundary triggered pixel collection circuitry.

14 Claims, 5 Drawing Sheets

IMAGE SENSOR AND IMAGE COLLECTION SYSTEM

TECHNICAL FIELD

The present disclosure relates to the field of image collection technology, in particular to an image sensor and an image collection system.

BACKGROUND

Image sensor is applied to various application fields, e.g., the detection of a moving object. In this application field, as compared with a conventional image sensor (e.g., a valid pixel sensor), a dynamic vision image sensor has attracted more and more attention due to its unique advantages.

The dynamic vision image sensor (dynamic vision sensor for short) merely responds to dynamic information in a field of view, and directly collects a change in a light intensity in the field of view, so it is particularly applied to such a field as machine vision. In the dynamic vision sensor, each pixel collection circuitry operates independently and asynchronously, so as to detect the change in the light intensity at a certain region in the field of view. When the change in the light intensity has been detected, the pixel collection circuitry outputs an event. An external reading circuitry manages an entire array of pixel collection circuitries, and read information about the generated event.

Because the dynamic vision sensor merely responds to the dynamic information in the field of view, as compared with the conventional image sensor where the event is outputted at a fixed frame rate, it is able to significantly reduce a bandwidth and provide a response more rapidly. However, when there is a large amount of dynamic information in the field of view, e.g., when a near object moving rapidly in the field of view is detected, a large quantity of events will be generated by the array of pixel collection circuitries within a short time period. The reading circuitry needs to read the events one by one, so the advantage of the dynamic vision sensor in terms of low bandwidth is not obvious. In addition, it takes a certain time to read each event, leading to a congestion in a reading channel. At this time, the events generated by the array of pixel collection circuitries need to wait in line to be read, and a very large reading delay occurs. The reading delay may cause an error in time information about the event, and a backend application may also be adversely affected.

Based on the above, there is an urgent need to provide a new image sensor so as to solve the above-mentioned problems.

SUMMARY

An object of the present disclosure is to provide an image sensor and an image collection system, so as to solve or at least alleviate at least one of the above-mentioned problems.

In one aspect, the present disclosure provides in some embodiments an image sensor, including: a pixel collection circuitry array including a plurality of pixel collection circuitries, each pixel collection circuitry being configured to monitor a change in a light intensity in a field of view and enter a triggered state when the change in the light intensity meets a predetermined condition; a boundary triggered pixel determination array configured to determine a boundary triggered pixel collection circuitry in the pixel collection circuitries in the triggered state; and a reading unit configured to respond to the boundary triggered pixel collection circuitry and output address information about the boundary triggered pixel collection circuitry.

In a possible embodiment of the present disclosure, the boundary triggered pixel determination array is further configured to generate a reading request signal and a flag in accordance with a column request signal from the pixel collection circuitry array, and the flag is used to indicate a position type of a corresponding pixel collection circuitry.

In a possible embodiment of the present disclosure, the boundary triggered pixel determination array includes a plurality of boundary triggered pixel determination units, and the quantity of boundary triggered pixel determination units is equal to the quantity of columns in the pixel collection circuitry array.

In a possible embodiment of the present disclosure, the boundary triggered pixel determination unit includes: a reading request signal generation module configured to generate a reading request signal in accordance with column request signals from pixel collection circuitries in a column corresponding to the boundary triggered pixel determination unit and adjacent columns; and a flag generation module configured to generate the flag in accordance with column request signals from pixel collection circuitries in the column corresponding to the boundary triggered pixel determination unit and at least one adjacent column.

In a possible embodiment of the present disclosure, the reading unit includes: a row selection module configured to respond to a row request signal from the pixel collection circuitry array, and output row address information about a row to which has responded to the row request signal; a column selection module configured to scan a corresponding pixel collection circuitry in accordance with a reading request signal from the boundary triggered pixel determination array, and output column address information and the flag; and a reading control module configured to control the output of the row address information and the column address information.

In a possible embodiment of the present disclosure, the reading request signal generation module includes: an NAND gate, an input end of which is coupled to the pixel collection circuitry array and configured to receive the column request signals from the pixel collection circuitries in two columns adjacent to a current boundary triggered pixel determination unit, and an output end of which is coupled to an input end of an AND gate; and the AND gate, an input end of which is coupled to the pixel collection circuitry array and configured to receive an output from the NAND gate and the column request signal from the pixel collection circuitries in a column corresponding to the boundary triggered pixel determination unit.

In a possible embodiment of the present disclosure, the flag generation module includes: an NOT gate, an input end of which is coupled to the pixel collection circuitry array and configured to receive the column request signal from the pixel collection circuitries in a column adjacent to a current boundary triggered pixel determination unit, and an output end of which is coupled to an input end of an AND gate; and the AND gate, an input end of which is coupled to the pixel collection circuitry array and configured to receive an output from the NOT gate and the column request signal from the pixel collection circuitries in a column corresponding to the boundary triggered pixel determination unit.

In a possible embodiment of the present disclosure, the flag generation module includes: an NOR gate, an input end of which is coupled to the pixel collection circuitry array and configured to receive the column request signal from the pixel collection circuitries in two columns adjacent to the current boundary triggered pixel determination unit, and an output end of which is coupled to an input end of an AND gate; and the AND gate, an input end of which is coupled to the pixel collection circuitry array and configured to receive an output from the NOR gate and the column request signal from the pixel collection circuitries in a column corresponding to the boundary triggered pixel determination unit.

In a possible embodiment of the present disclosure, the image sensor further includes a global control unit configured to reset the pixel collection circuitry array when the image sensor is energized, and release the pixel collection circuitry array from a reset sate when the pixel collection circuitry array is maintained in a stable initial state, so as to enable the pixel collection circuitry array to operate.

In a possible embodiment of the present disclosure, the flag includes one of a head flag, a tail flag and an isolated flag.

In a possible embodiment of the present disclosure, the pixel collection circuitry includes: a photoelectric detection module configured to monitor an optical signal in real time and output a corresponding electric signal; a triggering generation module, a first input end of which is coupled to the photoelectric detection module, a first output end of which is coupled to a reading interface module, and which is configured to generate a triggering generation signal when the electric signal has met a predetermined triggering condition, and output the triggering generation signal to the reading interface module; and the reading interface module coupled to the triggering generation module and configured to communicate with the reading unit through a row request line, a row selection line, a column request line and a column selection line.

In a possible embodiment of the present disclosure, the triggering generation module includes: a filtration amplification module, an input end of which is coupled to an output end of the photoelectric detection module, and which is configured to filter and amplify the electric signal; and a threshold comparison module, an input end of which is coupled to an output end of the filtration amplification module, and which is configured to receive an electric signal from the filtration amplification module and generate the triggering generation single when the electric signal has met the predetermined triggering condition.

In another aspect, the present disclosure provides in some embodiments an image collection system, including the above-mentioned image sensor, and an image processor coupled to the image sensor and configured to determine address information about all pixel collection circuitries in a triggered state in the image sensor in accordance with received address information about a boundary triggered pixel collection circuitry.

In a possible embodiment of the present disclosure, the image sensor is configured to output the address information about the boundary triggered pixel collection circuitry and a corresponding flag to the image processor, and the image processor is further configured to determine the address information about all pixel collection circuitries in the triggered state in the image sensor in accordance with the address information about the boundary triggered pixel collection circuitry and the corresponding flag.

According to the image sensor in the embodiments of the present disclosure, the boundary pixel collection circuitry is determined in all the pixel collection circuitries in the triggered state, and then merely the boundary pixel collection circuitry and the flag thereof, rather than a plurality of consecutive pixel collection circuitries in the triggered state, are read when an event is read by the reading unit. As a result, it is able to reduce a data volume of the event to be read by the image sensor, thereby to provide the dynamic vision sensor with a low bandwidth in a high-speed scenario. In addition, it is able to read the data more rapidly, thereby to prevent the occurrence of a congestion in a reading channel, and reduce a reading delay.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
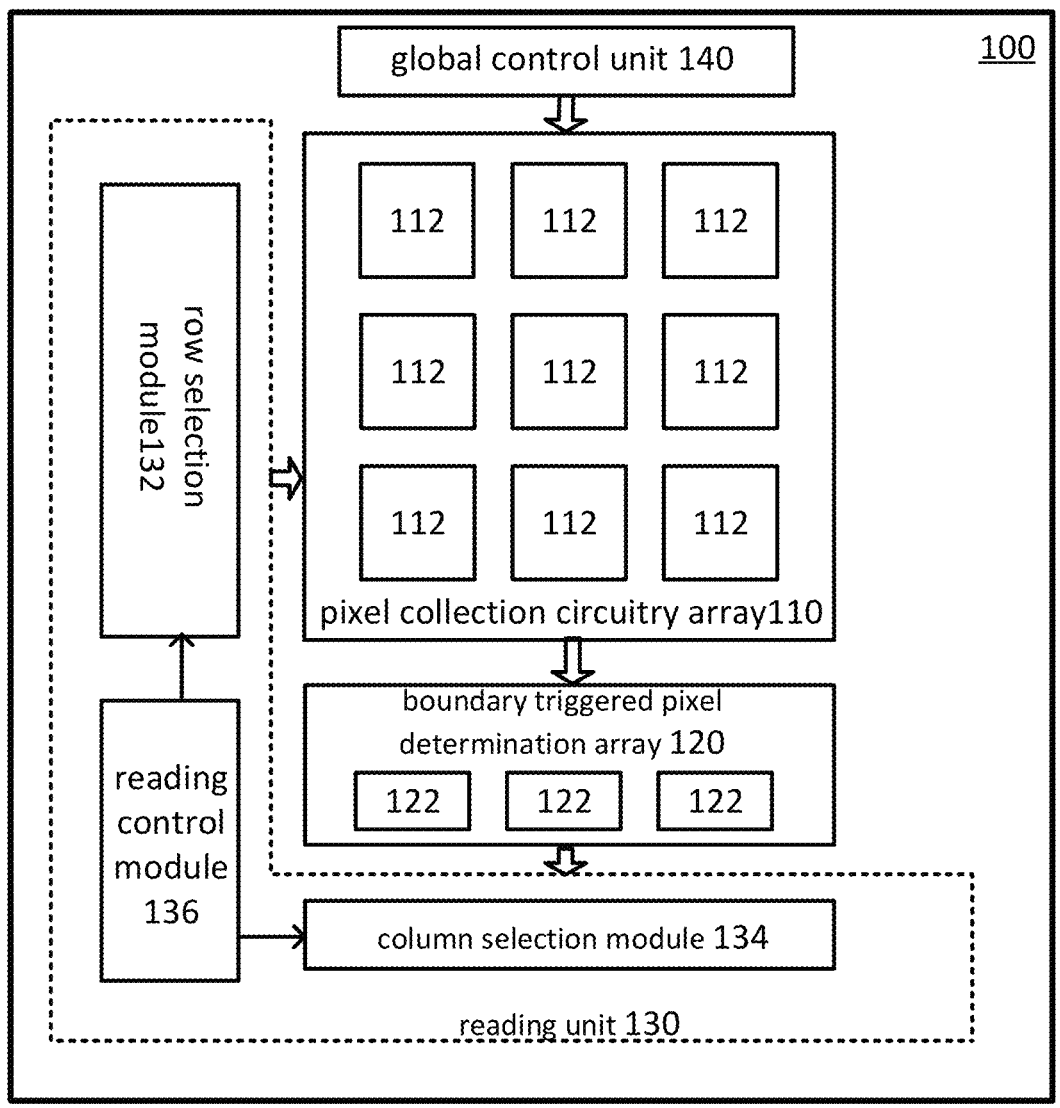
FIG. 1 is a schematic view showing an image sensor 100 according to one embodiment of the present disclosure.

FIG. 1 is a schematic view showing an image sensor 100 according to one embodiment of the present disclosure. The image sensor 100 is used to detect an object moving at a high speed, so as to output an event data stream associated with a movement event. In a possible embodiment of the present disclosure, the image sensor 100 is coupled to an external image processor, and configured to output the event data stream to the external image processor for subsequent calculation and application, which will not be particularly defined herein.

As shown in FIG. 1, the image sensor 100 includes a pixel collection circuitry array 110, a boundary triggered pixel determination array 120 and a reading unit 130. The pixel collection circuitry array 110 is a core component of the image sensor 100, and includes a plurality of pixel collection circuitries 112 arranged evenly in rows and columns (FIG. 1 shows a 3*3 pixel collection circuitry array, but the present disclosure is not limited thereto). The boundary triggered pixel determination array 120 is coupled to the pixel collection circuitry array 110 and the reading unit 130, and the reading unit 130 is further coupled to the pixel collection circuitry array 110.

Apart from the above, the image sensor 100 further includes a global control unit 140 coupled to the pixel collection circuitry array 110 and configured to control an operating state of each pixel collection circuitry 112. Generally speaking, the global control unit 140 is configured to reset the entire pixel collection circuitry array 110 when the image sensor 100 is energized, so as to ensure that each pixel collection circuitry 112 is maintained in a stable initial state. Then, the global control unit 140 is configured to release the pixel collection circuitry array from a reset state, and the pixel collection circuitry array 110 starts to operate normally.

In the embodiments of the present disclosure, the image sensor merely responds to a change in a light intensity in a field of view, and its function is mainly achieved through the pixel collection circuitries 112. When the pixel collection circuitry array 110 is released by the global control unit 140 from the reset state, the pixel collection circuitry array 110 starts to respond to the change in the light intensity. To be specific, the pixel collection circuitry array 110 monitors the change in the light intensity in the field of view, and when the change in the light intensity has met a predetermined condition (e.g., when the change in the light intensity exceeds a predetermined threshold), enters a triggered state (in a possible embodiment of the present disclosure, the pixel collection circuitry in the triggered state is called as a triggered pixel event or an event).

The boundary triggered pixel determination array 120 includes a plurality of boundary triggered pixel determination units 122, and the quantity of boundary triggered pixel determination units 122 is equal to the quantity of columns in the pixel collection circuitry array 110 (as shown in FIG. 1, three boundary triggered pixel determination units 122 are provided). In other words, each boundary triggered pixel determination unit 122 corresponds to pixel collection circuitries in one column, so as to receive signals from the pixel collection circuitries.

In a possible embodiment of the present disclosure, the boundary triggered pixel determination array 120 is configured to determine a boundary triggered pixel collection circuitry from the pixel collection circuitries 112 in a triggered state. In the embodiments of the present disclosure, when there is a pixel collection circuitry B not in the triggered state on the left or right of a pixel collection circuitry A in the triggered state, the pixel collection circuitry A is a boundary triggered pixel collection circuitry, otherwise, the pixel collection circuitry A is an internal triggered pixel collection circuitry.

Each boundary triggered pixel determination unit 122 receives the signals from the pixel collection circuitries in a corresponding column, and determines the pixel collection circuitries in the triggered state from the pixel collection circuitries in the column. Further, the boundary triggered pixel determination array 120 determines the boundary triggered pixel collection circuitries from the pixel collection circuitries in the triggered state.

The reading unit 130 is a boundary module of the pixel collection circuitry array 110, and it is mainly used to manage events generated by the pixel collection circuitry array 110 (i.e., the pixel collection circuitries in the triggered state).

In a possible embodiment of the present disclosure, the reading unit 130 responds to the boundary triggered pixel collection circuitry, and outputs address information about the boundary triggered pixel collection circuitry. The address information includes row address information and column address information about the boundary triggered pixel collection circuitry.

In a possible embodiment of the present disclosure, the reading unit 130 outputs the address information to the external image processor, so that the image processor processes the event stream generated by the image sensor 100 to finally generate an image representing a change in the movement in the field of view.

The components of the image sensor 100 will be described hereinafter in conjunction with FIG. 1.

In order to achieve such functions as detecting the change in the light intensity in real time and communicating with an external reading circuitry, each pixel collection circuitry 112 usually includes a photoelectric detection module, a triggering generation module and a reading interface module.

The photoelectric detection module is configured to monitor an optical signal in real time, and output a corresponding electric signal. A first input end of the triggering generation module is coupled to the photoelectric detection module, and a first output end thereof is coupled to the reading interface module. The triggering generation module is configured to generate a triggering generation signal to the reading interface module when the electric signal has met a predetermined triggering condition. The reading interface module is coupled to the triggering generation module, and communicate with the reading unit 130 through a row request line, a row selection line, a column request line and a column selection line.

The triggering generation module further includes a filtration amplification module and a threshold comparison module. An input end of the filtration amplification module is coupled to an output end of the photoelectric detection module, and the filtration amplification module is configured to filter and amplify the electric signal from the photoelectric detection module. An input end of the threshold comparison module is coupled to an output end of the filtration amplification module, and the threshold comparison module is configured to receive an electric signal from the filtration amplification module (i.e., the filtered and amplified electric signal), and generate the triggering generation signal when the electric signal has met a predetermined condition.

It should be appreciated that, the pixel collection circuitry of the dynamic vision sensor is known in the art, so a specific structure and a specific function of each module will not be particularly defined herein.

Referring to FIG. 1 again, the reading unit 130 includes a row selection module 132, a column selection module 134 and a reading control module 136. The row selection module 132 is configured to manage the entire pixel collection circuitry array 110 in a row direction. The column selection module 134 is coupled to the boundary triggered pixel determination array 120, and configured to manage the entire pixel collection circuitry array 110 in a column direction in accordance with the boundary triggered pixel determination array 120. The reading control module 136 is coupled to the row selection module 132 and the column selection module 134, and configured to coordinate the row selection module 132 and the column selection module 134.

In a possible embodiment of the present disclosure, when a certain pixel collection circuitry 112 has entered the triggered state, a row request line to which the pixel collection circuitry 112 belongs is set as valid. The row selection module 132 of the reading unit 130 manages all the row request lines in the pixel collection circuitry array 110, and sets a corresponding row selection line as valid to respond to a valid row request. In addition, the address information about the selected row is encoded and outputted by the row selection module 132. When the row selection line is set as valid, the triggered pixel collection circuitry 112 in the row may set a corresponding column request line as valid.

At this time, the boundary triggered pixel determination unit 122 in a corresponding column of the boundary triggered pixel array 120 receives the column request signal. At first, the boundary triggered pixel array 120 determines boundary triggered pixel collection circuitries in accordance with the received column request signal, i.e., determines the pixel collection circuitry that needs to be read, so as to generate a corresponding reading request signal. Then, a corresponding flag is generated for each boundary triggered pixel collection circuitry. The flag is used to indicate a position type of the corresponding pixel collection circuitry, i.e., a position type of the boundary triggered pixel collection circuitry. In the embodiments of the present disclosure, the position type may be a head, a tail or an intermediate isolated position, and the corresponding flag may be one of a head flag, a tail flag and an isolated flag.

In a word, each boundary triggered pixel determination unit 122 converts the column request signal from the pixel collection circuitry array 110 into the reading request signal, generates the corresponding flag, and outputs the reading request signal and the flag to the corresponding column selection module 134.

The column selection module 134 receives the reading request signal and the flag. In a possible embodiment of the present disclosure, the column selection module 134 scans a corresponding pixel collection circuitry in accordance with the reading request signal, and outputs corresponding column address information and a corresponding flag, so that the backend image processor determines the other triggered pixel collection circuitries in the corresponding row in accordance with the flag.

The reading control module 136 controls the output of the row address information and the column address information. In a possible embodiment of the present disclosure, after all the triggered pixel collection circuitries in the row have been read, the reading control module 136 notifies the row selection module 132 to perform a row switching operation. The row selection module 132 cancels the row selection signal for a current row and selects a next row. The row selection module 132 responds to the valid row request signals randomly or in a certain order, as long as it is capable of responding to the valid row request signals fairly. Identically, the column selection module 134 may also scan the valid reading request signals randomly or in a certain order. Based on the above-mentioned reading mechanism, the image sensor 100 outputs asynchronous event streams, and each event stream includes a row address X, a column address Y, time information T (it refers to a time when the event is read, i.e., a time when the event is received by the backend image processor), and a flag F of the event. In other words, the outputted event is marked as (X, Y, T, F).

Figures 2, 3:
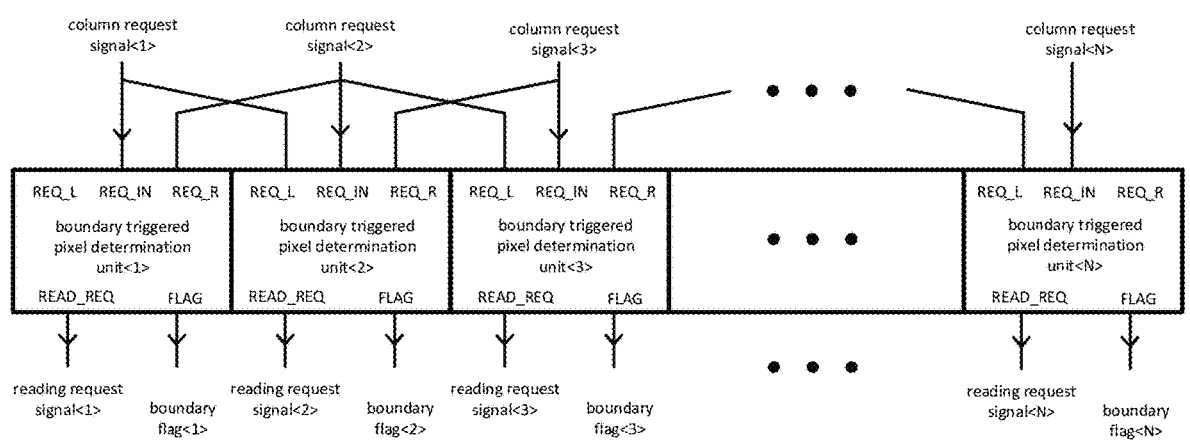
FIG. 2 is a schematic view showing three flags according to one embodiment of the present disclosure.
FIG. 3 is a schematic view showing a boundary triggered pixel determination array 120 according to one embodiment of the present disclosure.

FIG. 2 is a schematic view showing three flags according to one embodiment of the present disclosure. The generation of the three flags will be described hereinafter in conjunction with FIG. 2.

FIG. 2 shows one row of pixel collection circuitries in the pixel collection circuitry array 110, and the pixel collection circuitries filled with "I", i.e., second and fourth to ninth pixel collection circuitries, are in the triggered state. The pixel collection circuitries on the left (and on the right) of the second pixel collection circuitry, on the left of the fourth pixel collection circuitry and on the right of the ninth pixel collection circuitry are all non-triggered pixel collection circuitries. Based on the above, the boundary triggered pixel determination array 120 may determine that the second, fourth and ninth pixel collection circuitries are the boundary triggered pixel collection circuitries, and add flags for the three boundary triggered pixel collection circuitries.

It should be appreciated that, the three flags and a determination basis are for illustrative purposes only. Based on the description herein, a person skilled in the art may obtain the other position type of the boundary triggered pixel collection circuitry, which also falls within the scope of the present disclosure.

EXAMPLE 1: HEAD FLAG

The head flag represents that the boundary triggered pixel collection circuitry is located at the head of some consecutive triggered pixel collection circuitries. This flag is determined in accordance with whether a pixel collection circuitry on the left of the boundary triggered pixel collection circuitry is in the triggered state. When the pixel collection circuitry is not in the triggered state, the head flag of the boundary triggered pixel collection circuitry is set as 1; otherwise, it is set as 0. As shown in FIG. 2, the head flags of the second, fourth and ninth boundary triggered pixel collection circuitries are set as 1, 1 and 0 respectively.

EXAMPLE 2: TAIL FLAG

The tail flag represents that the boundary triggered pixel collection circuitry is located at the tail of some consecutive triggered pixel collection circuitries. This flag is determined in accordance with whether a pixel collection circuitry on the right of the boundary triggered pixel collection circuitry is in the triggered state. When the pixel collection circuitry is not in the triggered state, the tail flag of the boundary triggered pixel collection circuitry is set as 1; otherwise, it is set as 0. As shown in FIG. 2, the tail flags of the second, fourth and ninth boundary triggered pixel collection circuitries are set as 1, 0 and 1 respectively.

EXAMPLE 3: ISOLATED FLAG

The isolated flag represents that the boundary triggered pixel collection circuitry is an isolated triggered pixel collection circuitry. This flag is determined in accordance with whether the pixel collection pixels on the left and right of the boundary triggered pixel collection circuitries are in the triggered state. When the pixel collection circuitries are not in the triggered state, the isolated flag of the boundary triggered pixel collection circuitry is set as 1; otherwise, it is set as 0. As shown in FIG. 2, the isolated flags of the second, fourth and ninth boundary triggered pixel collection circuitries are set as 1, 0 and 0 respectively.

In order to further illustrate an operating principle of the boundary triggered pixel determination array 120, FIG. 3 shows a structure of the boundary triggered pixel determination array 120.

As shown in FIG. 3, the boundary triggered pixel determination array 120 consists of N same boundary triggered pixel determination units 122, i.e., a boundary triggered pixel determination unit <1>, a boundary triggered pixel determination unit <2>, a boundary triggered pixel determination unit <3>, . . . , and a boundary triggered pixel determination unit <N>, where N represents the quantity of columns of the pixel collection circuitry array 110. Each boundary triggered pixel determination unit 122 includes a reading request signal generation module and a flag generation module (not shown in FIG. 3). In a possible embodiment of the present disclosure, the reading request signal generation module is configured to generate the reading request signal in accordance with column request signals from the pixel collection circuitries in a column corresponding to the boundary triggered pixel determination unit 122 and in adjacent columns. The flag generation module is configured to generate the flag in accordance with column request signals from the pixel collection circuitries in the column corresponding to the boundary triggered pixel determination unit 122 and in at least one adjacent column. In other words, apart from two boundary triggered pixel determination units 122 at the head and tail, each boundary triggered pixel determination unit 122 receives three column request signals, i.e., REQ_IN, REQ_L and REQ_R, where REQ_IN represents a column request signal for a current column, REQ_L represents a column request signal for an adjacent column on the left of the current column, and REQ_R represents a column request signal for an adjacent column on the right of the current column. As shown in FIG. 3, the boundary triggered pixel determination unit <2>receives a column request signal <2>(REQ_IN), a column request signal <1>(REQ_L) and a column request signal <3>(REQ_R), generates a reading request signal <2>(READ_REQ) and a flag <2>(FLAG) in accordance with the three column request signals, and output them to the column selection module 134.

It should be appreciated that, for the two triggered pixel determination units at the head and tail, in a possible embodiment of the present disclosure, they may be considered as the boundary triggered pixel collection circuitries 122 as long as corresponding pixel collection circuitries are in the triggered state, and then the reading request signal is set as valid. For example, the boundary triggered pixel determination unit <1>at the head receives the column request signal <1>(REQ_IN) and the column request signal <2>(REQ_R), and REQ_L is set as 0 by default. The boundary triggered pixel determination unit <N>at the tail receives a column request signal <N>(REQ_IN) and the column request signal <N-1>(REQ_L), and REQ-R is set as 0 by default. Then, the flag is calculated, which will not be particularly defined herein.

In the embodiments of the present disclosure, for each boundary triggered pixel determination unit 122, when the reading request signal generation module 1222 determines that a corresponding pixel collection circuitry is a boundary triggered pixel collection circuitry, the reading request signal is set as valid, and a corresponding flag is generated by the flag generation module 1224. When the reading request signal generation module 1222 determines that corresponding pixel collection circuitry is not a boundary triggered pixel collection circuitry, the reading request signal is set as invalid. These functions may be achieved through a logic circuitry.

Figure 4A:
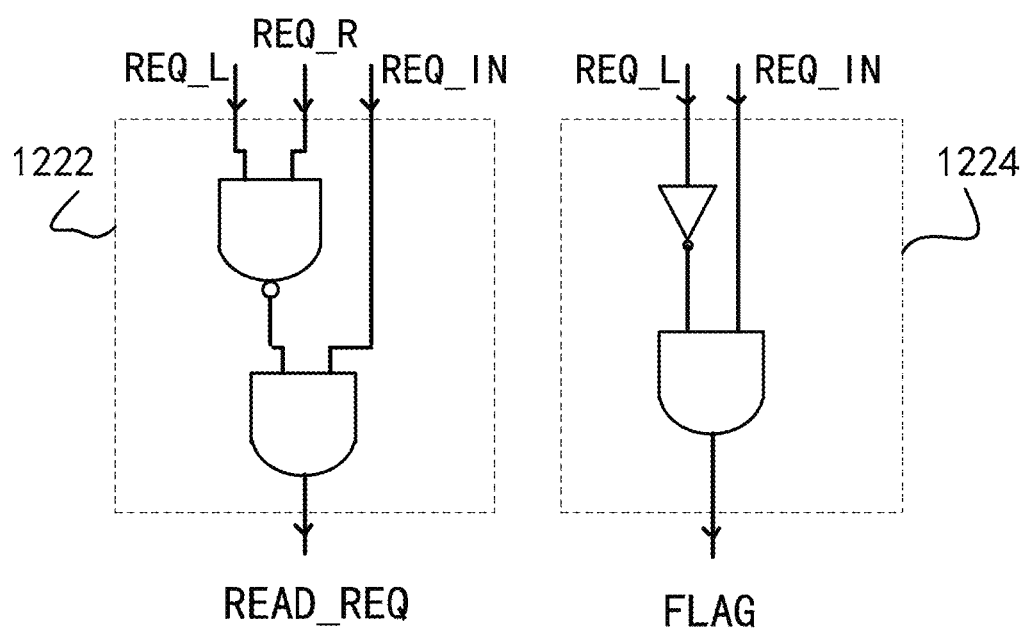
FIGS. 4A to 4C are circuit diagrams of a boundary triggered pixel determination unit 122 according to one embodiment of the present disclosure.
Figure 4B:
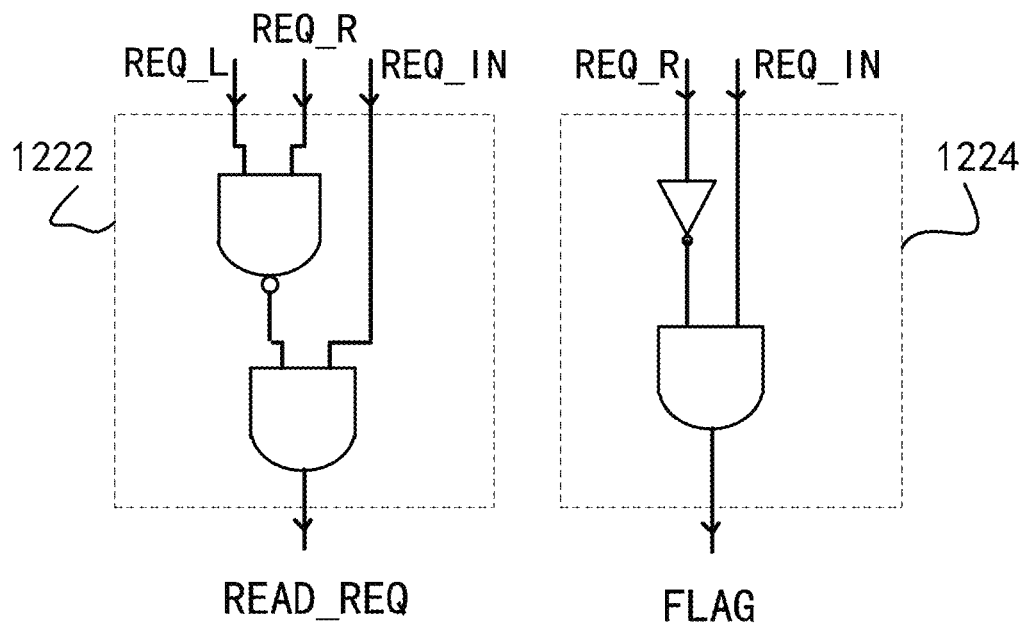
Figure 4C:
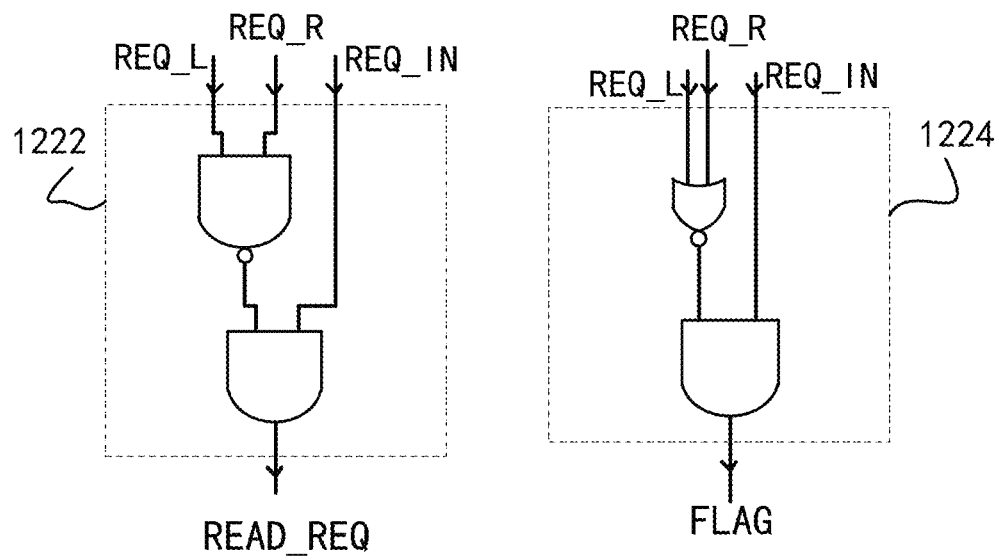

FIGS. 4A to 4C are circuit diagrams of the boundary triggered pixel determination unit 122.

Depending on different types of the flags, FIGS. 4A to 4C show the circuit diagrams of the boundary triggered pixel determination units 122 for generating the head tag, the tail tag and the isolated tag respectively.

In FIG. 4A, the reading request signal generation module 222 includes one NAND gate and an AND gate. An input end of the NAND gate is coupled to the pixel collection circuitry array, and the NAND gate is configured to receive column request signals (REQ_L and REQ_R) from the pixel collection circuitries in two columns adjacent to a current boundary triggered pixel determination unit 122. An output end of the NAND gate is coupled to one input end of the AND gate, and the other input end of the AND gate is coupled to the pixel collection circuitry array. The AND gate is configured to receive a column request signal (REQ_IN) from a pixel collection circuitry in a column corresponding to the boundary triggered pixel determination unit. In this regard, the AND gate receives REQ_IN and an output of the NAND gate, and outputs the reading request signal (READ_REQ). READ_REQ is 1 when and only when REQ_IN is 1 (i.e., the current pixel collection circuitry in the triggered state) and REQ_L and REQ_R are not both 1 (I.e., the pixel collection circuitries adjacent to the current pixel collection circuitry are not both in the triggered state), and at this time, the reading request signal is valid.

The flag generation module 1224 includes an NOT gate and an AND gate. An input end of the NOR gate is coupled to the pixel collection circuitry array, and the NOT gate is configured to receive a column request signal from a pixel collection circuitry in a column adjacent to the current boundary triggered pixel determination unit. Taking the head flag as an example, as shown in FIG. 4A, the input end of the NOT gate receives a column request signal (REQ_L) from the pixel collection circuitry on the left of the current pixel collection circuitry. An output end of the NOT gate is coupled to one input end of the AND gate, and the other input end of the AND gate is coupled to the pixel collection circuitry array. The AND gate is configured to receive a column request signal (REQ_IN) from the pixel collection circuitry in a column corresponding to the boundary triggered pixel determination unit. In this regard, the AND gate receives REQ_IN and an output of the NOT gate, and outputs the flag (FLAG). The FLAG is set as 1 when and only when REQ_L is 0 (i.e., the pixel collection circuitry on the left is not in the triggered state) and REQ_IN is 1 (i.e., the current pixel collection circuitry is in the triggered state).

In FIG. 4B, the reading request signal generation module 1222 is completely the same as that in FIG. 4A, which will not be particularly defined herein.

Taking the generation of the tail flag as an example, the flag generation module 1224 also includes an NOT gate and an AND gate. An input end of the NOT gate receives a column request signal (REQ_R) from a pixel collection circuitry on the right of the current pixel collection circuitry. An output end of the NOT gate is coupled to one input end of the AND gate, and the other input end of the AND gate is coupled to the pixel collection circuitry array. The AND gate is configured to receive a column request signal (REQ_IN) from a pixel collection circuitry in a column corresponding to the boundary triggered pixel determination unit. In this regard, the AND gate receives REQ_IN and an output of the NOT gate, and outputs the flag (FLAG). The FLAG is 1 when and only when REQ_IN is 1 (i.e., the current pixel collection circuitry is in the triggered state) and REQ_R is 0 (i.e., the pixel collection circuitry on the right of the current pixel collection circuitry is not in the triggered state).

In FIG. 4C, the reading request signal generation module 1222 is also the same as that in FIG. 4A, which will not be particularly defined herein.

Taking the isolated flag as an example, the flag generation module 1224 includes an NOR gate and an AND gate. An input end of the NOR gate is coupled to the pixel collection circuitry array, and the NOR gate is configured to receive column request signals (REQ_L and REQ_R) from pixel collection circuitries on the left and right of the current boundary triggered pixel determination unit 122. An output end of the NOR gate is coupled to one input end of the AND gate, and the other input end of the AND gate is coupled to the pixel collection circuitry array. The AND gate is configured to receive a column request signal (REQ_IN) from a pixel collection circuitry in a column corresponding to the boundary triggered pixel determination unit 122. In this regard, the AND gate receives REQ_IN and an output of the NOR gate, and outputs the flag (FLAG). The FLAG is 1 when and only when REQ_IN is 1 (i.e., the current pixel collection circuitry is in the triggered state) and REQ_L and REQ_R are both 0 (i.e., the two pixel collection circuitries on the left and right of the current pixel collection circuitry are not in the triggered stated).

Of course, the circuit diagrams of the boundary triggered pixel determination unit 122 are for illustrative purposes only, and the present disclosure is not limited thereto. Based on the above description, any logic circuitry capable of generating a corresponding reading request signal and a flag in accordance with the column request signal from the pixel collection circuitry array falls within the scope of the present disclosure.

Figure 5:
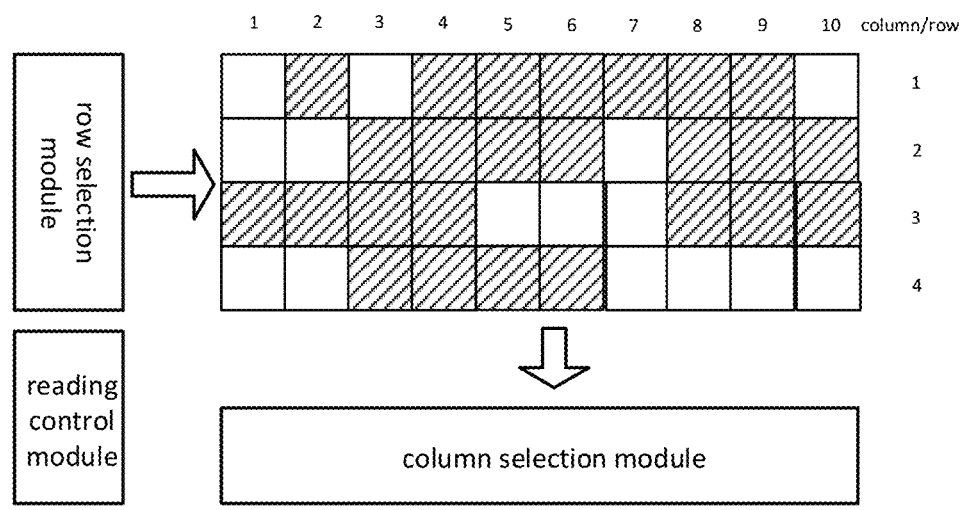
FIG. 5 is a schematic view showing a reading scenario for the image sensor according to one embodiment of the present disclosure.

In order to illustrate the advantages of the image sensor 100 in the embodiments of the present disclosure, FIG. 5 shows a reading scenario for the image sensor.

In this scenario, there is a large amount of dynamic information, so the quantity of triggered pixel collection circuitries in the entire pixel collection circuitry array is relatively large. In this scenario, the pixel collection circuitry array includes pixel collection circuitries arranged in four rows and ten columns, and one block represents a pixel collection circuitry. In order to differentiate the pixel collection circuitries from each other, the triggered pixel collection circuitry is filled with "/".

A process of outputting an event by a conventional dynamic vision sensor will be described hereinafter. Briefly, in the conventional dynamic vision sensor, when a certain pixel collection circuitry enters the triggered state, it may set a corresponding row request line as valid. A row selection module in a reading unit sets a corresponding row selection line as valid to respond to a valid row request. In addition, address information about a selected line is encoded and outputted by a row selection module. When the row selection line is set as valid, a triggered pixel collection circuitry in the row may set a corresponding column request line as valid. A column selection module manages all the column requests in a column direction, scans all valid column request lines one by one, and encodes and outputs a corresponding column address. When all the triggered pixel collection circuitries in the row have been read, a reading control module notifies a row selection unit to perform a row switching operation.

Hence, the reading unit needs to read all the triggered pixel collection circuitries in the pixel collection circuitry array, and output row and column addresses of the triggered pixel collection circuitries and time information about them in the format of (X, Y, T), where a unit of the time T is a time required for reading one pixel collection circuitry by the dynamic vision sensor. For ease of description, the unit of the time T is 1, and meanwhile it is presumed that it takes no time to perform the row switching operation. Here, it is presumed that each of the row selection module and the column selection module is configured to scan the triggered pixel collection circuitries in an ascending order. At first, the row selection module selects a first row. Next, the column selection module reads all the triggered pixel collection circuitries in the row in an ascending order, i.e., it outputs event streams (2, 3, 8), (2, 4, 9), (2, 5, 10), (2, 6, 11), (2, 8, 12), (2, 9, 13) and (2, 10, 14) sequentially. Then, the row selection module selects a third row and a fourth row sequentially, and output event streams (3, 1, 15), (3, 2, 16), (3, 3, 17), (3, 4, 18), (3, 8, 19), (3, 9, 20), (3, 10, 21), (4, 3, 22), (4, 4, 23), (4, 5, 24) and (4, 6, 26) sequentially.

Based on all the outputted event streams, it takes 25 time units for the dynamic vision sensor to read totally 25 events. The pixel collection circuitry array totally includes 40 pixel collection circuitries, and in this reading mode, a bandwidth saved by the dynamic vision sensor is very limited. As compared with a scanning mode where each pixel collection circuitry (no matter whether it is triggered) is read, it is merely able to save about 40% of the bandwidth in this reading mode. More importantly, it takes 25 time units for the reading, and time information about a last pixel collection circuitry given by the dynamic vision sensor is later by 25 time units than its real triggering time. Hence, the time information is inaccurate, and there is a relatively large error when the time information is used at the backend.

Researches show that, when there is a large amount of dynamic vision in the field of view, usually the events are distributed continuously in a space to some extent, which is mainly caused by the movement continuity. Within a certain time period, the pixel collection circuitries triggered by a same moving object are densely arranged in a space. Hence, when reading the events, the image sensor 100 in the embodiments of the present disclosure may merely read the boundary triggered pixel collection circuitries in the continuous pixel collection circuitries in the triggered state, rather than reading the internal triggered pixel collection circuitries. As a result, it is able to reduce the amount of to-be-read data about the pixel collection circuitries, thereby to reduce an output bandwidth a reading delay of the dynamic vision sensor.

Still taking FIG. 5 as an example, when the row selection module selects the first row, there are totally 7 triggered pixel collection circuitries in the first row, i.e., the pixel collection circuitries in second, and fourth to ninth columns. There is no triggered pixel collection circuitry on the left and right of the pixel collection circuitry in the second column (i.e., pixel collection circuitries in a first column and a third column are not triggered), so the pixel collection circuitry in the second column is a boundary triggered pixel collection circuitry, and it may be read. The pixel collection circuitries in the fourth to ninth columns are six continuous pixel collection circuitries in the row direction, the pixel collection circuitries in the fourth and ninth columns are boundary pixel collection circuitries, and the remaining four are internal pixel collection circuitries. For the six continuous triggered pixel collection circuitries, merely the pixel collection circuitries in the fourth and ninth columns may be read and notified to the backend image processor through the flags. Upon the receipt of the two boundary pixel collection circuitries, the image processor may determine the intermediate pixel collection circuitries in the triggered state. In this way, it is able to prevent valid event information from being lost while reducing the quantity of events read by the dynamic vision sensor.

According the image sensor in the embodiments of the present disclosure, considering the movement continuity of the object, most of the events generated by the pixel collection circuitry array within a certain time period are continuous in a space, and there is a large amount of redundancy information about the event in the space. When the redundancy information is eliminated, it is able to reduce the quantity of the to-be-read events while preventing the valid events from being lost. Different from the related art where the triggered pixel collection circuitries are scanned one by one, the image sensor 100 in the embodiments of the present disclosure may extract the boundary pixel collection circuitry, and merely scan the boundary pixel collection circuitry and its flag when the event (i.e., the row/column address information about the triggered pixel collection circuitry) is read by the reading unit, rather than reading the consecutive pixel collection circuitries in the triggered state. As a result, it is able to reduce the data volume of the events to be read by the dynamic vision sensor, thereby to provide the dynamic vision sensor with a low bandwidth in a high-speed scenario. In addition, it is able to read the data more rapidly, thereby to reduce a congestion in the reading channel as well as the reading delay.

Figure 6:
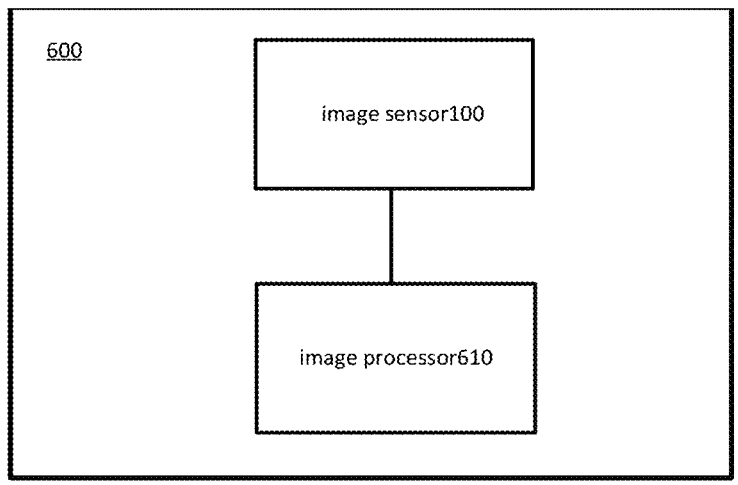
FIG. 6 is a schematic view showing an image collection system 600 according to one embodiment of the present disclosure.

FIG. 6 is a schematic view showing an image collection system 600 according to one embodiment of the present disclosure. As shown in FIG. 6, the image collection system 600 includes the image sensor 100 and an image processor 610 coupled to the image sensor 100.

As mentioned hereinabove, when the change in the light intensity in the field of view has met a predetermined condition, the image sensor 100 may output an event data stream about a triggered event. The event data stream includes address information about the boundary pixel collection circuitry and a corresponding flag (it should be appreciated that, the event data stream may further include, but not limited to, time information). The image sensor 100 may output the event data stream to the image processor 610.

The image processor 610 may determine address information about all triggered pixel collection circuitries in the image sensor 100 in accordance with the address information about the boundary triggered pixel collection circuitry and the corresponding flag.

A processor of determining, by the image processor 610, the address information about all the triggered pixel collection circuitries in the image sensor 100 in accordance with the address information about the boundary triggered pixel collection circuitry and the corresponding flag will be described hereinafter by taking the three flags in FIG. 2 as an example.

EXAMPLE 1: HEAD FLAG

Upon the receipt of the address information about the boundary triggered pixel collection circuitries in the second, fourth and ninth columns and the corresponding head flags, the image processor 610 may determine all the triggered pixel collection circuitries. To be specific, the head flag of the pixel collection circuitry in the second column is 1, and it means that it is a boundary triggered pixel collection circuitry at the head. The head flag of the pixel collection circuitry in the fourth column is 1, it means that it is also a boundary triggered pixel collection circuitry at the head, and there is no triggered pixel collection circuitry on the left and right of the pixel collection circuitry in the second column. The head flag of the pixel collection circuitry in the ninth column is 0, and it means that it is not a boundary triggered pixel collection circuitry at the head. The pixel collection circuitry in the fourth column is a boundary triggered pixel collection circuitry at the head, so the pixel collection circuitries in the fourth to ninth columns are all in the triggered state. In this way, it is able to determine that all the triggered pixel collection circuitries in the row include the pixel collection circuitries in the second, and the fourth to the ninth columns.

EXAMPLE 2: TAIL FLAG

Upon the receipt of the address information about the boundary triggered pixel collection circuitries in the second, fourth and ninth columns and the corresponding tail flags, the image processor 610 may determine all the triggered pixel collection circuitries. To be specific, the tail flag of the pixel collection circuitry in the second column is 1, and it means that it is a boundary triggered pixel collection circuitry at the tail. Because this pixel collection circuitry is a first boundary pixel collection circuitry in the row, the pixel collection circuitries in the first and third columns are not in the triggered state. Next, the tail flag of the pixel collection circuitry in the fourth column is 0, it means that it is not a boundary triggered pixel collection circuitry at the tail. The tail flag of the pixel collection circuitry in the ninth column is 1, it means that it is a boundary triggered pixel collection circuitry at the tail, and the pixel collection circuitries in the fourth to ninth columns are all in the triggered state. In this way, it is able to determine that all the triggered pixel collection circuitries in the row include the pixel collection circuitries in the second, and the fourth to the ninth columns.

EXAMPLE 3: ISOLATED FLAG

Upon the receipt of the address information about the boundary triggered pixel collection circuitries in the second, fourth and ninth columns and the corresponding isolated flags, the image processor 610 may determine all the triggered pixel collection circuitries. To be specific, the isolated flag of the pixel collection circuitry in the second column is 1, and it means that it is an isolated triggered pixel collection circuitry. The isolated flags of the pixel collection circuitries in the fourth and ninth columns are both 0, it means that they are not isolated triggered pixel collection circuitries, and the pixel collection circuitry in the ninth column is a tail of some consecutive triggered pixel collection circuitries. In this way, it is able to determine that all the triggered pixel collection circuitries in the row include the pixel collection circuitries in the second, and the fourth to the ninth columns.

In a word, the image collection system 600 in the embodiments of the present disclosure may collect the movement information about a high-speed objet in the field of view and calculate the optical flow information subsequently, so as to detect and track the high-speed object, which will not be particularly defined herein.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. An image sensor, comprising:
   a pixel collection circuitry array comprising a plurality of pixel collection circuitries, each pixel collection circuitry being configured to monitor a change in a light intensity in a field of view and enter a triggered state when the change in the light intensity meets a predetermined condition;
   a boundary triggered pixel determination array configured to determine a boundary triggered pixel collection circuitry in the pixel collection circuitries in the triggered state; and
   a reading unit configured to respond to the boundary triggered pixel collection circuitry and output address information about the boundary triggered pixel collection circuitry.

2. The image sensor according to claim 1, wherein the boundary triggered pixel determination array is further configured to generate a reading request signal and a flag in accordance with a column request signal from the pixel collection circuitry array, and the flag is used to indicate a position type of a corresponding pixel collection circuitry.

3. The image sensor according to claim 2, wherein the boundary triggered pixel determination array comprises a plurality of boundary triggered pixel determination units, and the quantity of boundary triggered pixel determination units is equal to the quantity of columns in the pixel collection circuitry array.

4. The image sensor according to claim 3, wherein the boundary triggered pixel determination unit comprises:
   a reading request signal generation module configured to generate a reading request signal in accordance with column request signals from pixel collection circuitries in a column corresponding to the boundary triggered pixel determination unit and adjacent columns; and
   a flag generation module configured to generate the flag in accordance with column request signals from pixel collection circuitries in the column corresponding to the boundary triggered pixel determination unit and at least one adjacent column.

5. The image sensor according to claim 1, wherein the reading unit comprises:
   a row selection module configured to respond to a row request signal from the pixel collection circuitry array, and output row address information about a row to which has responded to the row request signal;
   a column selection module configured to scan a corresponding pixel collection circuitry in accordance with a reading request signal from the boundary triggered pixel determination array, and output column address information and the flag; and
   a reading control module configured to control the output of the row address information and the column address information.

6. The image sensor according to claim 4, wherein the reading request signal generation module comprises:
   an NAND gate, an input end of which is coupled to the pixel collection circuitry array and configured to receive the column request signals from the pixel collection circuitries in two columns adjacent to a current boundary triggered pixel determination unit, and an output end of which is coupled to an input end of an AND gate; and
   the AND gate, an input end of which is coupled to the pixel collection circuitry array and configured to receive an output from the NAND gate and the column request signal from the pixel collection circuitries in a column corresponding to the boundary triggered pixel determination unit.

7. The image sensor according to claim 4, wherein the flag generation module comprises:
   an NOT gate, an input end of which is coupled to the pixel collection circuitry array and configured to receive the column request signal from the pixel collection circuitries in a column adjacent to a current boundary triggered pixel determination unit, and an output end of which is coupled to an input end of an AND gate; and
   the AND gate, an input end of which is coupled to the pixel collection circuitry array and configured to receive an output from the NOT gate and the column request signal from the pixel collection circuitries in a column corresponding to the boundary triggered pixel determination unit.

8. The image sensor according to claim 4, wherein the flag generation module comprises:
   an NOR gate, an input end of which is coupled to the pixel collection circuitry array and configured to receive the column request signal from the pixel collection circuitries in two columns adjacent to the current boundary triggered pixel determination unit, and an output end of which is coupled to an input end of an AND gate; and the AND gate, an input end of which is coupled to the pixel collection circuitry array and configured to receive an output from the NOR gate and the column request signal from the pixel collection circuitries in a column corresponding to the boundary triggered pixel determination unit.

9. The image sensor according to claim 1, further comprising a global control unit configured to reset the pixel collection circuitry array when the image sensor is energized, and release the pixel collection circuitry array from a reset sate when the pixel collection circuitry array is maintained in a stable initial state, so as to enable the pixel collection circuitry array to operate.

10. The image sensor according to claim 2, wherein the flag comprises one of a head flag, a tail flag and an isolated flag.

11. The image sensor according to claim 1, wherein the pixel collection circuitry comprises:

a photoelectric detection module configured to monitor an optical signal in real time and output a corresponding electric signal;

a triggering generation module, a first input end of which is coupled to the photoelectric detection module, a first output end of which is coupled to a reading interface module, and which is configured to generate a triggering generation signal when the electric signal has met a predetermined triggering condition, and output the triggering generation signal to the reading interface module; and the reading interface module coupled to the triggering generation module and configured to communicate with the reading unit through a row request line, a row selection line, a column request line and a column selection line.

12. The image sensor according to claim 11, wherein the triggering generation module comprises:

a filtration amplification module, an input end of which is coupled to an output end of the photoelectric detection module, and which is configured to filter and amplify the electric signal; and a threshold comparison module, an input end of which is coupled to an output end of the filtration amplification module, and which is configured to receive an electric signal from the filtration amplification module and generate the triggering generation single when the electric signal has met the predetermined triggering condition.

13. An image collection system, comprising the image sensor according to claim 1, and an image processor coupled to the image sensor and configured to determine address information about all pixel collection circuitries in a triggered state in the image sensor in accordance with received address information about a boundary triggered pixel collection circuitry.

14. The image collection system according to claim 13, wherein the image sensor is configured to output the address information about the boundary triggered pixel collection circuitry and a corresponding flag to the image processor, and the image processor is further configured to determine the address information about all pixel collection circuitries in the triggered state in the image sensor in accordance with the address information about the boundary triggered pixel collection circuitry and the corresponding flag.

* * * * *